Sept. 7, 1948.  H. W. DIETERT  2,448,964
APPARATUS FOR TESTING MOLDING SAND
Filed April 10, 1944  2 Sheets-Sheet 1

INVENTOR.
HARRY W. DIETERT
BY
*Whittemore Hulbert & Belknap*
ATTORNEYS

Sept. 7, 1948.   H. W. DIETERT   2,448,964
APPARATUS FOR TESTING MOLDING SAND
Filed April 10, 1944   2 Sheets-Sheet 2

INVENTOR.
HARRY W. DIETERT
BY
ATTORNEYS

Patented Sept. 7, 1948

2,448,964

UNITED STATES PATENT OFFICE 2,448,964

APPARATUS FOR TESTING MOLDING SAND

Harry W. Dietert, Detroit, Mich.

Application April 10, 1944, Serial No. 530,404

3 Claims. (Cl. 73—16)

The invention relates to the testing of molding materials, such as molding sand to determine characteristics which affect the forming of molds thereof.

More particularly, the invention relates to the testing of changes in volume and strength due to temperature changes and the invention consists in the novel method and apparatus used for this purpose as hereinafter described.

In the testing of molding sands it is of importance to determine the degree of expansion which takes place at elevated temperatures. This I accomplish as follows: The sample to be tested is placed in a refractory tube such as one formed of quartz and is rammed or compressed to a degree corresponding to that in a mold. The compressed sample is then placed between abutments in a furnace which raises it to a temperature corresponding to that which it might attain in contact with molten metal. One of the abutments is movable and is connected to a gage which indicates the expansion at raised temperature. Inasmuch as the sample is confined within the refractory tube, it is held from lateral displacement so that the test will be accurate as to lineal expansion.

Sample forming means

Figure 1:
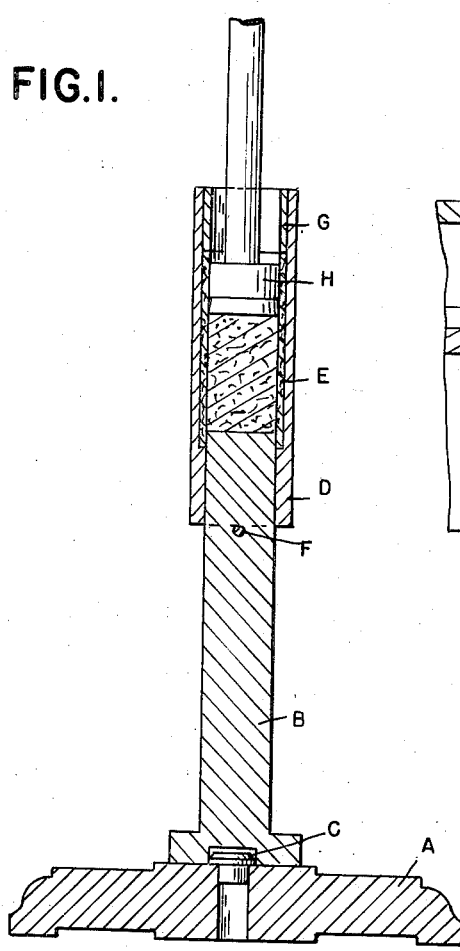
Fig. 1 is a vertical central section through the apparatus for compacting the sample to be tested.
Figure 3:
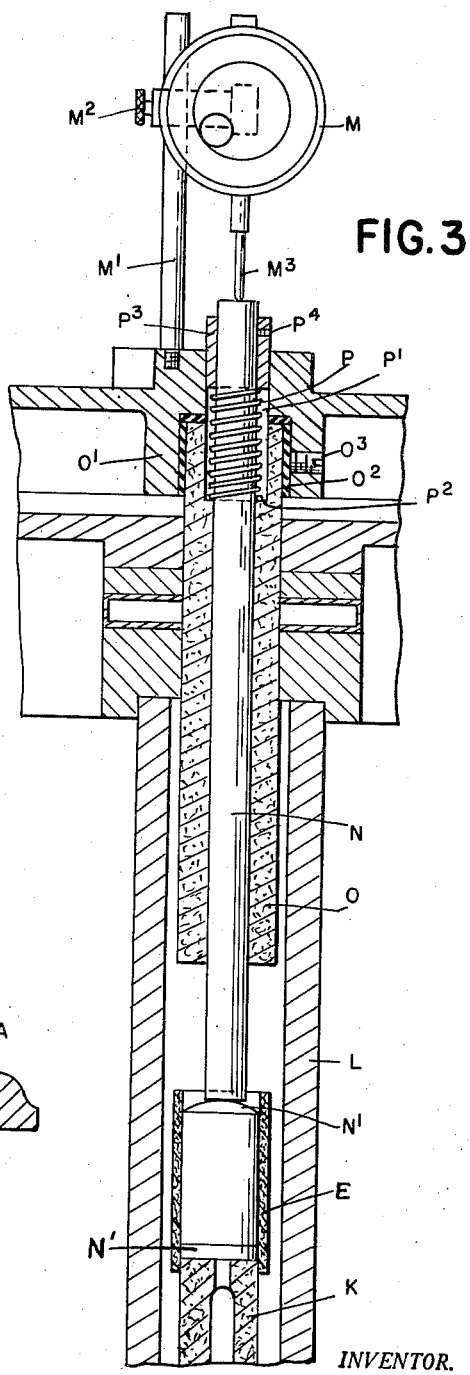
Fig. 3 is a vertical section through a portion of Fig. 2.
Figure 2:
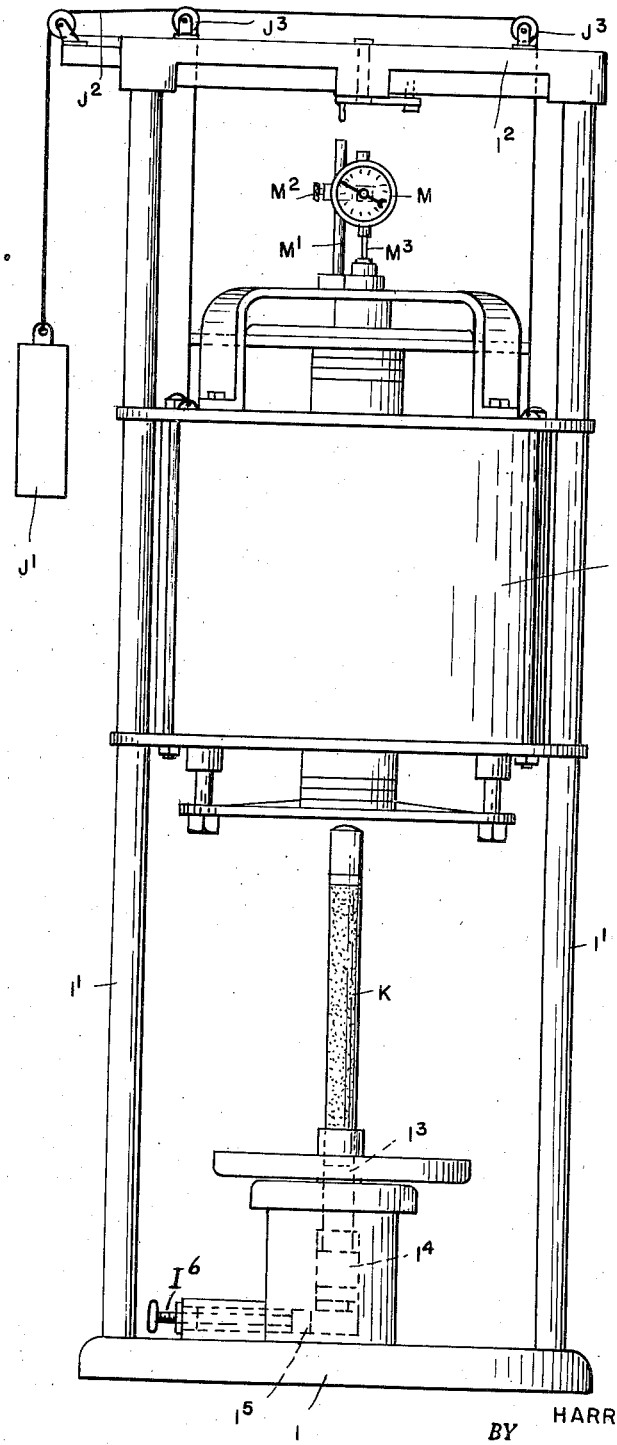
Fig. 2 is an elevation of the apparatus for measuring the expansion of the sample under heat.

The apparatus used for carrying out the method comprises, first, the means for compacting the sample within the refractory tube and, second, the means for heating the sample and measuring its expansion, the construction being as follows. As shown in Fig. 1, A is a base and B is a cylindrical column rising therefrom and attached thereto by a headed pin C. D is a tubular casing for receiving and reinforcing a quartz tube E in which the sample is to be placed and compacted. The lower end of the casing D is of an internal diameter corresponding to that of the column B which is the same as the internal diameter of the refractory tube E. This permits of sleeving the casing D on the column and temporarily supporting it thereon by a cross pin F with the upper end of the column extending a short distance within the tube E. A bushing G is then placed in the upper end of the casing D to protect the upper end of the tube E. The sample to be tested is next placed within the tube E and is compacted by suitable means such as a ram H. This may be accomplished without danger of rupturing the tube E as the latter is reinforced by the casing D. The pin F may then be removed which permits of telescoping the casing D over the column B thereby withdrawing it from the tube E. The latter may then be lifted off from the column and transferred to the testing apparatus.

Expansion measuring apparatus

The apparatus for measuring the expansion is of the general character of that shown in my former Patent 2,279,368 issued April 14, 1942. It comprises a frame including a base I and rods I' extending upward therefrom connected at their upper ends by a cross head I². Slidably mounted on the rods I' is a furnace J which is counterbalanced by a weight J' connected thereto by cables J² passing over sheaves J³ on the cross head I². Between the two rods I' and in axial alignment with the furnace J is a rod K preferably formed of refractory material and supported at its lower end upon a piston I³ of a hydraulic cylinder I⁴. A piston I⁵ operated by a hand screw I⁶ forms a means for displacing the liquid in the cylinder I⁴ to raise or lower the piston I³ such as described in my former patent. The rod K is of an external diameter corresponding to the internal diameter of the tube E so that the latter may be placed with its lower end sleeved upon said rod and with the compressed sample abutting against the upper end of the rod. Within the furnace J is a tubular resistor L similar to that shown in my former patent and suitable electrical connections thereto which need not be described in detail. The construction is such that the tubular resistor may be heated to the desired temperature and the furnace then lowered to surround the tube E and sample therein to heat the latter to a corresponding temperature. For measuring the expansion, a gage M is mounted on the upper end of the furnace being adjustably secured to an upwardly extending post M' by a clamp M². The operating stem M³ of the gage extends downward and into contact with a rod N formed of refractory material which extends downward into the furnace. This rod is surrounded and reinforced by a refractory tube O, the upper end of which engages a socket O' in the top head of the furnace and is secured therein by packing material O² and a set screw O³. The weight of the rod N is counterbalanced by a spring P which is sleeved about said rod and extends within an enlargement or counterbore P' in the tube O. The lower end of this spring abuts against a shoulder P², while its upper end abuts against a collar P³ secured to the rod N by a set screw P⁴. Thus, the spring will support the rod and by adjusting the gage its operating stem may be brought into contact with the upper end of the rod N in its counterbalanced position.

*Operation*

In performing the test suitable abutment members N' are inserted into the tube E in contact with the upper and lower ends of the sample therein. The tube E with the sample and abutments therein is placed in engagement with the rod K while the furnace J is in an elevated position so as to give proper clearance. The furnace is then lowered until the lower end of the rod N contacts with the upper abutment member N' within the tube E. If in so lowering the furnace a pressure is placed on the rod N which will move the gage from zero position, this may be adjusted back to zero by adjusting the screw I⁶ to lower the piston I³ and the rod K supported thereon. When the sample is heated to the desired temperature, its linear expansion will raise the rod N and through the stem M³ will operate the gage M to indicate the amount of movement. This completes the test and the furnace may then be raised to remove the sample therefrom.

What I claim as my invention is:

1. In an apparatus for testing the expansion of compacted molding sand when heated, an electric furnace having a tubular resistor for forming therein a heating chamber, a refractory tube extending downward from the upper end of said furnace into said heating chamber, a refractory rod slidable within said tube and forming with its lower end an abutment for the compacted sample to be tested, a spring sleeved upon said rod with its upper end engaging a collar thereon, said spring being located within a recess in said tube and abutting against a shoulder of said tube for counterbalancing the weight of said rod, a gage mounted on said furnace in operative relation to the upper end of said rod to measure the displacement thereof, a second refractory rod extending upward within said heating chamber and forming an opposite abutment for the sample to be tested, an open-ended refractory tube in which the sample is compacted telescopically engaging said refractory rods, and means for supporting said furnace for relative movement with respect to said second refractory rod to afford access to the open ended refractory tube containing the sample.

2. In an apparatus for testing the linear expansion of a compacted sample when heated, a furnace having a heating chamber, a refractory tube secured to and extending downward from the upper end of said furnace into said heating chamber, a refractory rod slidable within said tube, the lower end of said rod constituting one abutment for the sample to be tested, counterbalancing means for said rod within said tube between abutments on the rod and tube, a gage mounted on the furnace in operative relation to the upper end of said slidable rod to measure the displacement thereof, a second refractory rod extending upward within said heating chamber in alignment with said slidable rod, the upper end of said second rod constituting a second abutment for the sample to be tested, an open ended refractory tube in which the sample is compacted receiving adjacent ends of said rods, and means for supporting the furnace for relative movement with respect to the second rod to afford access to the open ended refractory tube containing the sample.

3. In an apparatus for testing the linear expansion of a compacted sample when heated, a furnace having a heating chamber, an upright refractory tube secured to said furnace and extending into said heating chamber, a refractory rod slidable within and projecting beyond one end of said upright tube, one end of said rod constituting one abutment for the sample to be tested, counterbalancing means for said rod at the other end of said upright tube, a gage mounted on the furnace in operative relation to said slidable rod to measure the displacement thereof, a second refractory rod extending within said heating chamber in alignment with said slidable rod, one end of said second rod constiututing a second abutment for the sample to be tested, an open ended refractory tube in which the sample is compacted receiving adjacent ends of said rods, and means for supporting the furnace for relative movement with respect to the second rod to afford access to the open ended refractory tube containing the sample.

HARRY W. DIETERT.

REFERENCES CITED

The following references are of record in the file of this patent:

UNITED STATES PATENTS

| Number | Name | Date |
|---|---|---|
| 1,065,108 | Blaul et al. | June 17, 1913 |
| 1,434,500 | Pearce et al. | Nov. 7, 1922 |
| 1,444,567 | Sperr | Feb. 6, 1923 |
| 2,157,194 | Webber et al. | May 9, 1939 |
| 2,279,368 | Dietert | Apr. 14, 1942 |
| 2,280,966 | Nadai et al. | Apr. 28, 1942 |
| 2,290,868 | Eriksson | July 28, 1942 |
| 2,336,286 | Owen | Dec. 7, 1943 |
| 2,351,572 | Kingston | June 13, 1944 |